Jan. 28, 1969  G. L. HANSEN  3,424,095
GEAR PUMPS AND GEAR POWER UNITS
Filed March 3, 1966  Sheet 1 of 4

United States Patent Office 3,424,095
Patented Jan. 28, 1969

1

3,424,095
GEAR PUMPS AND GEAR POWER UNITS
Gunnar Lyshoj Hansen, Nordborg, Denmark, assignor to Danfoss A/S, Nordborg, Denmark, a company of Denmark
Filed Mar. 3, 1966, Ser. No. 531,607
Claims priority, application Germany, Mar. 4, 1965,
D 46,674
U.S. Cl. 103—126          8 Claims
Int. Cl. F04c 1/04, 1/06

ABSTRACT OF THE DISCLOSURE

A rotary machine for use as a pump or a power unit has a housing comprising an internally toothed gear and an orbitally movable rotor comprising an externally toothed gear. Each of the gears has a polygonal pitch curve defined by the intersections of lines normal to points of sealing interengament between the gears, the relation between the normals being that they are of unequal length and the square of the longer normal minus the square of the shorter normal is equal to a constant so that there is a constant relation between the angular movement of the rotor and the fluid displacement of the machine. This provides a constant delivery in case of a pump and constant angular movement in case of a power unit.

---

The present invention relates generally to rotary machines and more particularly to gear pumps, and gear prime movers or power units such as gear motors or turbines and the like.

Many types of rotary machines, for example gear pumps, are known that have different tooth shapes such as involute teeth, cycoid teeth, etc. All of these known types of gear pumps have a considerable disadvantage in that when the pump is driven at a constant speed, or number of revolutions, it delivers a quantity of fluid or output which varies. Moreover, the varying quantities are delivered as pulsations which cause pressure fluctuations which can be noisy in operation. In known gear pumps the pressure fluctuation disadvantage is minimized by the use of pressure chambers or accumulators or other dampening means. For example, the use of dampening pressure controlled valves which are frictionally delayed and the like is well known.

Gear prime movers, such as turbines or gear motors driven by a constant pressure fluid medium also develop varying moments of rotation or outputs depending on the teeth frequency or spacing as above described relative to pumps. This is generally overcome by overdimensioning the turbine or power unit so that the smallest moment developed will suffice for all working conditions or positions of the gear-type rotor deliverying the output. Moreover, the gear turbine or gear power unit may be constructed as a high-speed turbine so that its inertia contributes to develop a smooth and constant output and the rotor is carried past positions in which the smallest moments of rotation are developed. These high-speed power units or turbines must accordingly "turn over" at high speeds to operate efficiently and porperly and as a consequence reduction gears must be used for connecting such power units to a load. Thus, it is not possible to use known constructions for making gear prime movers deliver an output at about ten revolutions per minute without overdimensioning them or having to resort to the use of reduction gears.

The rotary machine, according to the invention, comprises in combination a housing or casing having a spur internal gear having a base circle and a driven rotor or rotary piston comprising a spur external gear disposed internally of the housing. The internal gear and the external gear each have a substantially polygonal pitch-curve. The external gear has a pivotal axis driven along a circular path having as its center the center of the base circle of the internal gear. The gears have mating teeth disposed effective in operation to define two separate chambers therebetween for receiving a fluid in one chamber and effective to discharge the received fluid from the other of the chambers.

According to the invention, the above-described problems and difficulties are eliminated by correcting the radius of the rolling-curve of each of the two gear wheels with the period of the circular pitch in relation to a constant value so that the moments of rotation of a gear turbine, are approximately constant or equal at all operating positions and outputs and the outputs of a gear pump, according to the invention, are constant, equal quantities delivered at substantially constant pressure or pressures.

Heretofore, the pitch-curve of all the gears in rotary machines, such as gear pumps or gear power units, was a circle. However, if a pitch-circle is the basis, it is not possible to obtain delivery of a constant quantity or development of substantially constant moments of inertia by means of any tooth shapes whatsoever. Not until the pitch-circle in each circular pitch is corrected with the period of the circular pitch, i.e. differs from the circular form can the desired conditions be fulfilled.

A feature of the present invention is the use of a pitch-curve having a suitable polygonal configuration. The corners of the polygon correspond to specific working positions of the gears as described in detail hereinafter. The pitch-curve of at least one of the gears must have slightly bent or curved segments. Moreover, the sides of the polygon, constituting the pitch-curve segments, need not be of equal length.

It is particularly advantageous in the invention to have the pitch-curve, which is polygonal, have the corners which may have some curvature, of the polygon curve disposed substantially on a center line of a tooth and tooth space, respectively. It is possible to have other corners, of the polygon, between two corners disposed on the center line of two neighboring teeth or spaces. In this manner, tooth contact is continuously obtained such that two sealing or points of contact by the teeth are obbtained defining two separate chambers in the unit of the invention and the points of contact change during operations such that the two chambers, as later described, are constantly defined in the rotary gear apparatus to which the invention has been applied.

The present invention avoids prior problems and now it is no longer a problem to have the contact point, effected between two gears, a constant distance from the rolling-point as it changes from one tooth pair to a neighboring tooth. Thus the disturbing factor, which influenced the variations of the quantity of fluid delivered by the known gear pumps and the problem as to varying moments of rotation in known gear power units, is overcome.

The invention also has the advantageous feature that the teeth of the internal and external gears are limited by two independent curves for the addendi circles thereof and only the tooth flanks and the tips of the teeth corresponding to the addendum circles respectively work together. In this way, the contact points effecting the seal points between the two chambers, for example pressure and suction chambers, are formed only by means of the tooth tips and the other seal point is effected by the flanks of cooperating teeth. Therefore, both contact surfaces can be shaped according to the desired conditions. Air can be entrapped in the tooth spaces and the operation of the pump is not affected as the seal or contact points "move" or "change" relatively long distances without undesirable consequences.

Another feature of the invention is that the teeth of the internal gear have outwardly bulging flanks and concave faces merging smoothly in an S-shaped configuration. The teeth of the internal gear each comprise a convex arcuate tip merging smoothly with the faces thereof. The internal gear has teeth with concave faces and curved flanks and bulging at the gear curve line which is between the gear tooth face and flank. The tips of the teeth of this gear are not as arcuate as the tips of the other but are convex. These teeth too have S-shaped sides or face and flanks. The inner flank and outer face sections of the teeth have a smaller angle of curvature than the middle or gear line section intermediate the flanks and faces. In this way, the gears effect a very powerful meshing condition at the moment that a contact point moves from one gear tooth pair to another.

The tooth configuration and gear construction is such that in operation some of the spaces defined between the teeth within a given chamber above described are in communication with each other such as to effectively cooperate to define the two chambers in operation and make possible reduced inlet and outlet conduits. Further, this permits simplified inlet and outlet connections to be made if relative motion between the two gears is effected while the two gears are being rotated.

The invention is applicable to gear rotary machines such as those that use paired gear wheels and is particularly applicable to slow-running gear rotary machines using a paired external and an internal gear arrangement in which one of the gears has a fixed position and the other rotates.

Other features and advantages of the gear combination, in accordance with the present invention, will be better understood as described in the following specification and appended claims, in conjunction with the following drawings in which:

Figure 1:
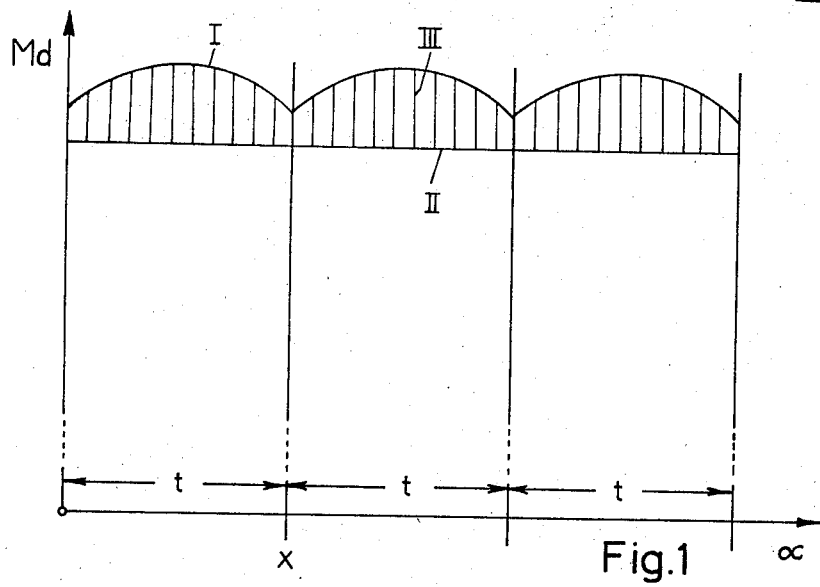
FIG. 1 is a moment of rotation diagram of an apparatus according to the invention.

While the invention will be described as applied to a pump, those skilled in the art will understand that the principles of the invention are equally applicable to gear power units such as gear motors or turbines which work on the principle of converting the kinetic energy of a fluid into rotary mechanical motion.

According to the drawing, the invention illustrated in FIGS. 2–5 comprises an inner external spur gear 1 which functions as a rotor or rotary piston which has a center $M_1$ for the base circle thereof which moves clockwise in orbital movement along a circular path about a base circle center $M_2$ of an outer casing or housing comprising an outer internal spur gear 2 whose axis corresponding to the base circle center thereof may be fixed. For example orbital movement of the inner gear may be provided by an eccentric cam 20 fixed on a rotating shaft 21. The inner gear is an external spur gear which has eight peripheral teeth 3 and tooth spaces 4, respectively. The outer internal gear 2 has nine internal teeth 5 and tooth spaces 6, respectively. The teeth and tooth spaces of the two gears are effective in operation to define a suction chamber on the right side of the vertical axis of symmetry of the apparatus, for example, the suction chamber 7 illustrated in FIG. 2 in communication with a conduit 7' for the supply of a fluid which may be under pressure when the inner rotor or gear is rotated in a clockwise direction and the center $M_1$ moves around the center $M_2$ in a circular path as above described. At the same time that the chamber 7 is formed a discharge chamber 8 on the left hand side of the axis is formed and is in communication with a discharge conduit or outlet 8'.

The suction or inlet chamber 7 and discharge chamber 8 are separated from each other by fluid-tight seal points effected by the teeth at fluid-tight contact points 9 and 10 in which the upper contact point 10 is in a condition in which the next upper point of contact will be contact point 11 so that the seal point or contact point 10 is about to "jump" or "move" to seal point 11. At this instant of operation a rolling-point 12 is obtained at a point of intersection of three normals or vectors later referred to as "levers" $k_9$ $k_{10}$, and $k_{11}$ which are at right angles to tangents to the three contact or seal points 9, 10, 11. The pitch curves of the respective gears are then defined by the intersetcions of the normals $k_9$, $k_{10}$ and $k_{11}$.

The inner gear has a pitch-curve 13 having a polygonal configuration in which the sides have a slight curvature and the outer gear has a pitch-curve 14 in which the sides of the polygonal configuration of the curve are substantially rectilinear. The rolling-point moves on the polygonal pitch-curve 14.

For purposes of illustrating the invention, the moment diagram in FIG. 1 can be referred to for a better understanding thereof. The normals $k_9$, $k_{10}$ and $k_{11}$ may be considered or thought of as working as levers during rotation. Thus, the long normal or lever $k_{10}$ develops a moment of rotation according to curve I as the length of this normal or lever changes in length along the circular pitch $t$. The moment of rotation is illustrated as having reached its minimum value at the instant shown in FIG. 2 as the contact point is about to shift from point 10 to point 11 so that the normal can be thought of as "jumping" or "moving" from $k_{10}$ to $k_{11}$ and then increases again. A moment curve is generated as in the well-known gear combinations with the difference that the difference between the maximum and minimum value of the moment curve is larger because of the circular pitch-curve. This is the reason why the point of change of direction of the polygonal pitch-curve, i.e. the corners of the polygon, must be situated substantially at the center line of a tooth of the outer internal gear 2 and a tooth space of the inner external gear 1, respectively.

The influence of the lever $k_9$ is in the opposite direction and is subtracted from the moment of rotation curve I since an approximately rectilinear rotation-moment line II is desired. Accordingly, the influence of the moment $k_9$ must be equal to the vertical distances III between the lines I and II in the optimum case. This means: (a) that the small lever $k_9$ at the moment of change of the contact point 10 to point 11, i.e. illustrated in the diagram at $x$ should have its smallest value, and (b) that $k_9$ should alter its size or length as smoothly as possible without radical changes. This cannot be accomplished or fulfilled if the pitch-curve is a circle. The desired conditions can, however, be easily fulfilled when a pitch-curve is used which is corrected in the manner heretofore described and is non-circular, and polygonal as heretofore described.

Figure 2:
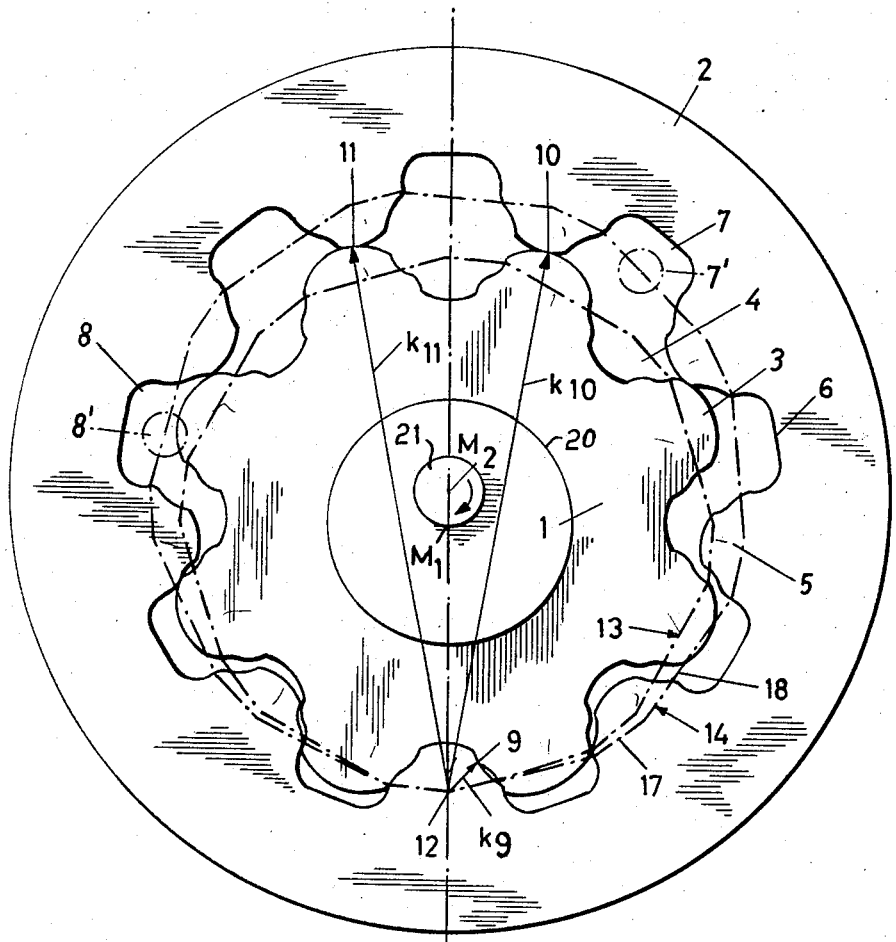
FIG. 2 is a diagrammatic sectional view of a gear rotary machine provided with the invention.
Figure 3:
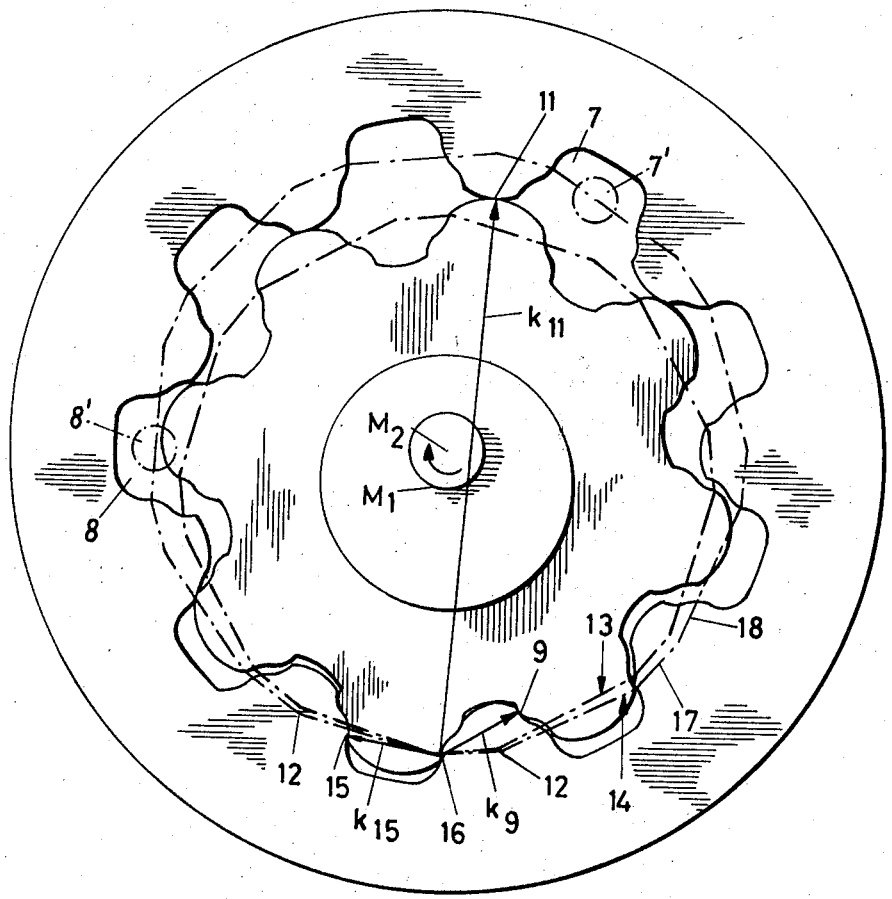
FIG. 3 is a section view similar to FIG. 2 illustrating a position of the elements different than that in FIG. 2.

During rotation of the inner gear, the short lever $k_9$ must also "move" from the contact point 9 to a contact point 15, as illustrated in the working position in FIG. 3. This can be arranged in a way that the present rolling-point lies at the same distance from the contact or seal points 9 and 15 so that the normals or levers $k_9$ and $k_{15}$ are of an equal length. As the mode of correction after the "jump" must be altered somewhat, a change in the path of the polygonal curve must also take place at this point. This change lies between the polygon's corner 12 where the rolling-point lies when the long levers "jumps" or changes. In the known gear combinations, the short lever changes in length in a non-smooth manner in which case a large change occurs in the characteristics of the moment of rotation. Thus, according to the invention, polygonal pitch-curves are obtained which, inside the circular pitch have a short length segment 17 and a long length segment or section 18 successively and alternately between the points of change of direction of the polygon. Both pitch-curves have successively a long segment and then a short section or segment, as can be seen in FIG. 2.

Figure 4:
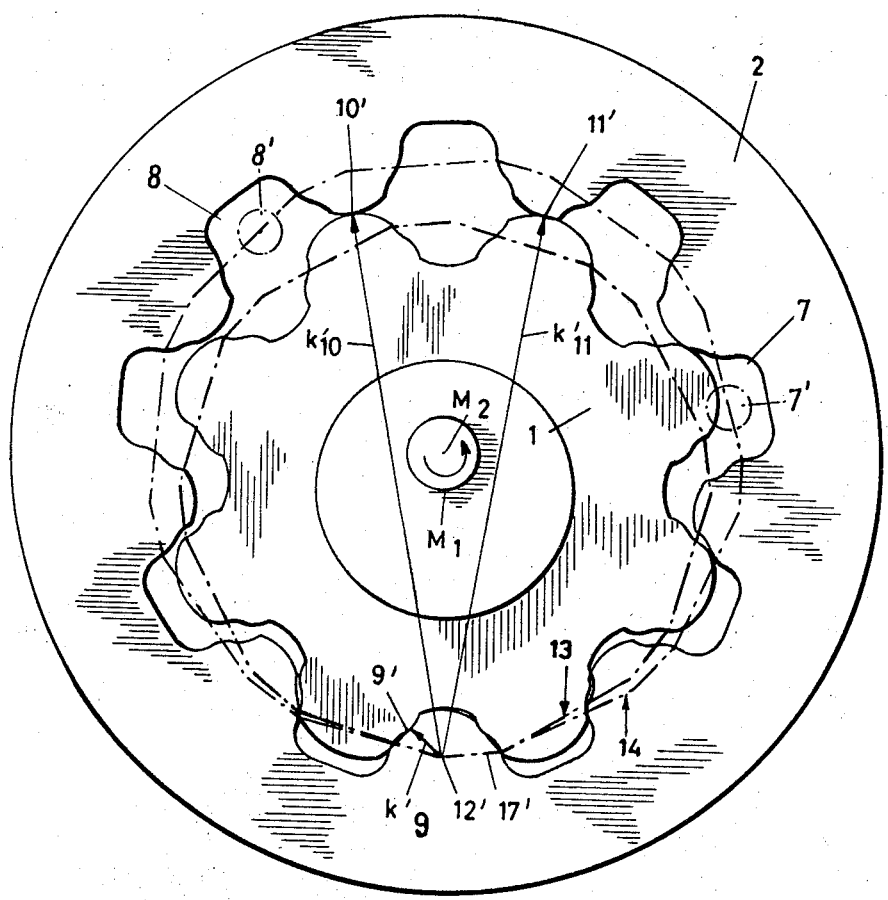
FIG. 4 is a sectional view similar to FIG. 2 illustrating a first working position of a paired combination gear with a rotation direction opposite to that of FIG. 1.

The principles above described are applicable to a gear pair 1, 2 constructed, FIG. 4, and disposed as heretofore described but rotatable in a different relative direction in which the suction chamber 7 becomes the pressure or discharge chamber and the left hand chamber 8 is the suction chamber so that the suction or supply conduit or inlet 7' becomes an outlet while the outlet 8' becomes an inlet. In this mode of operation, the contact or fluid-tight seal points 9', 10' and 11' are obtained with the resultant normals or levers $k_9'$, $k_{10}'$, and $k_{11}'$. During rotation in the counterclockwise, or opposite direction to the first described direction of rotation, the short section 17' of the pitch-curve lies relative the rolling-point 12' as shown although the gears remain unchanged in all other respects.

Figure 5:
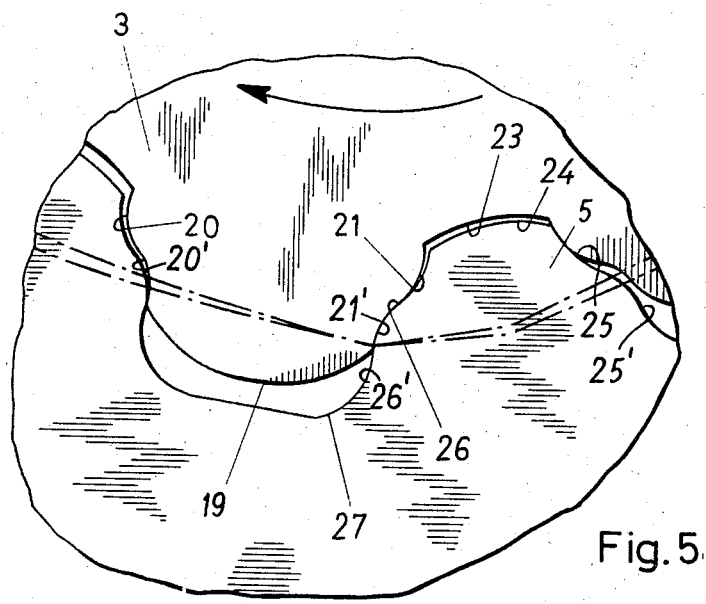
FIG. 5 is a fragmentary view, on an enlarged scale, of a cooperative tooth pair of the gears in FIG. 3 and illustrates the manner in which a seal point between the teeth is effected.

As shown in FIG. 5, each tooth 3 of the inner gear has a curved tip 19 corresponding to the outermost part thereof to the addendum circle and two identical flanks, 20 and 21, which bulge outwardly. The teeth 3 of the internal gear each comprise a convex arcuate tip 19 merging smoothly with concave faces 20', 21' thereon which merge smoothly with the outwardly bulging flanks 20 and 21, which are symmetrical and identical. The tooth spaces between individual teeth have a curved bottom 23. The individual teeth 5 of the outer or internal gear have a curved tip 24 lying on the addendum circle thereof configured like the bottoms 23 of the spaces between the teeth of the inner gear and have concave faces 25, 26 which cooperate with the outwardly bulging flanks of the inner gear and a substantially curved gear line that cooperates with the faces of the inner gear and merge smoothly with the curved flanks 25', 26' of the outer gear. During operation, the gear tooth tips 19, 24 effect contact and thereby effect one of the substantially fluid-tight seal points, for example, points 10, 11 and the flanks and faces will effect the other substantially fluid-tight seal point that defines the chambers, as above described. For example, the other seal point, points 9, 15. As each seal point is needed over part of the circumference only, tooth spaces within the chambers 7 and 8, respectively, may communicate with each other and no seal or contact must be provided between the tips and tooth flanks and faces.

As can be seen, the flanks and faces, 20, 21, 20', 21', 25', 26', 25, 26 of the teeth are substantially S-shaped. The S-shaped sides of the teeth are such that the inner and outer sections of each of the flanks are disposed at a smaller angle to the radius leading to the center of the tooth than the middle section. During the "jump" instant of the smallest lever, the gears are thus in contact with each other along surfaces which take up the pressure substantially vertically or radially which contributes to a much smoother and safer operation of the apparatus.

The gear combination above described results in an almost constant pressure or delivery of a constant quantity of fluid when used in a pump and a substantially constant moment of rotation when applied to a gear power unit.

Those skilled in the art will understand that instead of pumping a liquid the gear combination can convert the kinetic energy of a liquid received through an inlet to rotary motion of the inner gear and deliver a rotary output through an output shaft, for example, connected to the inner gear. Moreover, both gears may receive movement so long as relative movement therebetween is effected. Furthermore, although the outer gear has been defined herein as a casing or housing, it will be understood that the outer gear functions as a casing for the inner gear and the complete apparatus may embody housing structure externally of the outer gear.

Regardless of the different shapes, the gear teeth may be produced by means of a milling machine. If a mathematically known curve cannot be used, the gear curve can be constructed or developed if the equation $k_{10}^2 - k_9^2 =$ constant is assumed.

While a preferred embodiment of the invention has been shown and described, it will be understood that many modifications and changes can be made within the true spirit of the scope of the invention.

What I claim and desire to secure by letters patent is:

1. A rotary machine for use as a pump or a power unit, comprising a housing comprising an internally toothed gear having a base circle, a rotor comprising an externally toothed gear disposed eccentrically internally of said internally toothed gear with space between said gears, said gears having intermeshing teeth, means providing orbital movement of said externally toothed gear relative to said internally toothed gear, teeth of said externally toothed gear engaging teeth of said internally toothed gear at points on approximately diametrically opposite sides of said externally toothed gear to provide fluid seals dividing the space between said gears into a chamber of expanding volume for receiving a fluid and a contracting chamber for discharging a fluid, means defining a fluid inlet to admit fluid to said expanding chamber and means defining a fluid outlet to discharge fluid from said contracting chamber, each of said gears having a polygonal pitch curve defined by the intersection of two lines normal respectively to tangents to the tooth surfaces at said two points of sealing interengagement between the gears, the relation between said two normals being that they are of unequal length and that the square of the longer normal minus the square of the shorter normal is equal to a constant, whereby the relation between the relative angular movement of said gears and the resulting change in volume of said chambers is a constant.

2. In a rotary machine according to claim 1, in which the teeth of said external gear have outwardly bulging flanks and concave faces merging smoothly.

3. In a rotary machine according to claim 2, in which the teeth of said external gear each comprises a convex arcuate tip merging smoothly with the faces thereof.

4. In a rotary machine according to claim 1, in which each pitch-curve has short and long segments sequentially and alternately.

5. In a rotary machine according to claim 1, in which the polygonal pitch-curve of one said gear has corners disposed along the center lines of respective teeth of said one gear and the polygonal pitch-curve of the other said gear has corners aligned with tooth spaces between said respective teeth of said other gear.

6. In a rotary machine according to claim 1, in which said mating teeth each have a convex tip and each gear curve section thereof defines an angle with a radius of a respective gear greater than angles defined by the flanks and faces of said gear teeth.

7. In a rotary machine according to claim 1, in which said mating gear teeth are configured with S-shaped flank and face profiles defining angular spaced contact points defining seal points effective to define said chambers and the angular distance between said seal points remains substantially angularly constant relative a rolling-point of said gears.

8. A rotary machine according to claim 7, in which inner and outer portions of each tooth flank are disposed at a smaller angle to a radius leading to the middle of the respective tooth than a middle portion of said tooth flank.

References Cited

UNITED STATES PATENTS

| Re. 25,291 | 12/1962 | Charlson | 91—56 |
| 1,389,189 | 8/1921 | Feuerheerd | 103—130 |
| 2,547,392 | 4/1951 | Hill et al. | 103—126 |
| 2,666,336 | 1/1954 | Hill et al. | 103—126 |
| 2,871,831 | 2/1959 | Patin | 103—130 |
| 2,912,937 | 11/1959 | Insley | 103—130 |

FRED C. MATTERN, JR., *Primary Examiner.*

WILBUR J. GOODLIN, *Assistant Examiner.*

U.S. Cl. X.R.

103—130